(12) United States Patent
Costello

(10) Patent No.: US 10,733,405 B2
(45) Date of Patent: Aug. 4, 2020

(54) REAL-TIME THREE-DIMENSIONAL (3D) SHAPE VALIDATION

(71) Applicant: NCR Corporation, Duluth, GA (US)

(72) Inventor: Christopher John Costello, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/884,881

(22) Filed: Jan. 31, 2018

(65) Prior Publication Data

US 2020/0143130 A1 May 7, 2020

(51) Int. Cl.
| | |
|---|---|
| *G06K 15/00* | (2006.01) |
| *G06K 7/14* | (2006.01) |
| *H04N 7/18* | (2006.01) |
| *G06T 7/13* | (2017.01) |
| *G06K 7/10* | (2006.01) |
| *G06T 7/60* | (2017.01) |
| *H04N 13/204* | (2018.01) |
| *G06Q 20/20* | (2012.01) |
| *G06Q 20/18* | (2012.01) |

(52) U.S. Cl.
CPC ....... *G06K 7/1413* (2013.01); *G06K 7/10722* (2013.01); *G06T 7/13* (2017.01); *G06T 7/60* (2013.01); *H04N 7/188* (2013.01); *H04N 13/204* (2018.05); *G06Q 20/18* (2013.01); *G06Q 20/20* (2013.01)

(58) Field of Classification Search
USPC ............ 235/383, 385, 462.1, 462.14, 462.01
See application file for complete search history.

(56) References Cited

U.S. PATENT DOCUMENTS

| | | | | |
|---|---|---|---|---|
| 2008/0149725 A1* | 6/2008 | Rosenbaum | ........... | G06Q 20/20 235/462.41 |
| 2010/0217678 A1* | 8/2010 | Goncalves | ........... | G06Q 20/203 705/22 |
| 2011/0215147 A1* | 9/2011 | Goncalves | ........... | G07G 1/0063 235/383 |
| 2013/0254114 A1* | 9/2013 | Smith | ................. | G07G 1/0054 705/67 |
| 2016/0350931 A1* | 12/2016 | Costello | ................. | G06T 7/11 |

FOREIGN PATENT DOCUMENTS

EP    3076372 A1 * 10/2016 ............. H04N 7/181

* cited by examiner

*Primary Examiner* — Tuyen K Vo
(74) *Attorney, Agent, or Firm* — Schwegman, Lundberg & Woessner

(57) ABSTRACT

A three-dimensional image (3D) image for a shape of an orientation of an item is captured when an item barcode for the item is captured by a scanner during item checkout at a terminal. Edges for the shape and dimensions for the shape are calculated from the 3D image based on the orientation. The shape dimensions are compared against expected dimensions for a candidate item that is identified from item information in the item barcode and a decision is made as to whether to validate the item barcode for the item during item checkout or as to whether to invalidate the item barcode and suspend item checkout at the terminal for an audit of the item checkout.

20 Claims, 4 Drawing Sheets

US 10,733,405 B2

REAL-TIME THREE-DIMENSIONAL (3D) SHAPE VALIDATION

BACKGROUND

A common way to steal products in retails stores through barcode substitution. A customer substitutes a less expensive item's barcode onto a more expensive item as its barcode. When this occurs at attendant assisted Point-Of-Sale (POS) terminals, the attempted theft is frequently missed because the attendants often scan too quickly or are unaware of the actual item that they are scanning. Furthermore, when this is done by a customer operating a Self-Service Terminal (SST) detecting the theft in real time is particularly difficult.

Verifying a correct barcode for an item being scanned during a checkout requires a visual analysis of the item versus item information associated with the attached barcode. Prior attempts to solve the problem have focused on image recognition on the item, which is compared against a model image for the item associated with the attached barcode.

One problem with such approaches is that the image processing is time consuming and has to rely on estimations based on sampled pixels from the captured image or the item being scanned. This is not an ideal situation and current approaches take a significant amount of processing time, which can slow down transaction throughput at the checkout terminal.

As a result, barcode substitution remains a significant source of theft in the industry and there is a need for a more processor efficient and time efficient approach to item validation during checkout preventing theft.

SUMMARY

In various embodiments, methods and a system are provided for real-time 3D item shape validation during a checkout at a terminal.

According to an embodiment, a method real-time 3D item shape validation is provided. Specially, and in an embodiment, dimensions for a shape of an item are calculated from a three-dimensional (3D) image of the item based on one or more expected orientations of a candidate item scanned from an item barcode on the item when the 3D image is captured. Next, the shape and the dimensions are compared against an expected shape and expected dimensions associated with the candidate item. Finally, a determination is made whether to validate or invalidate processing of the item during item checkout based on the comparing.

DETAILED DESCRIPTION

Figure 1:
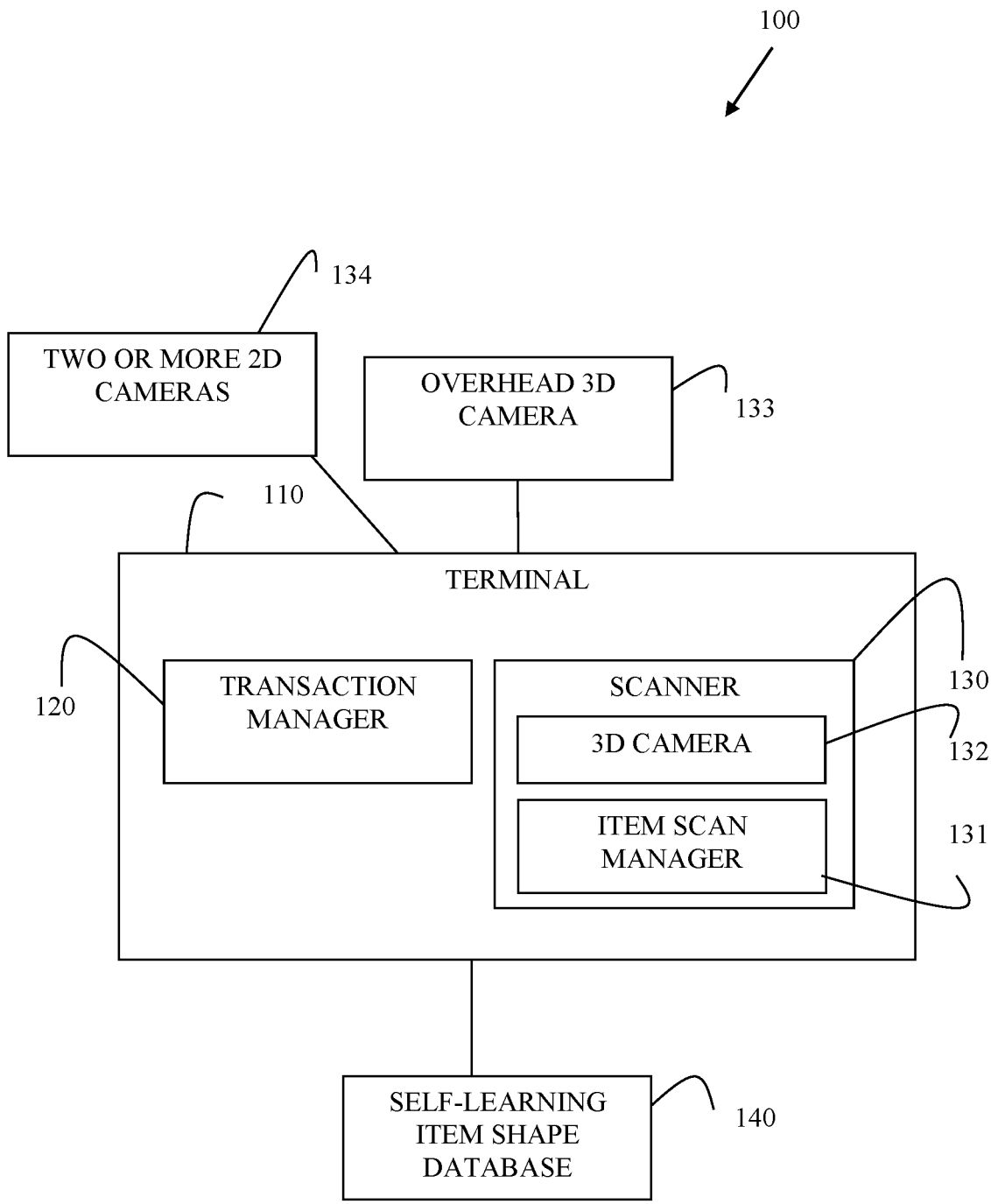
FIG. 1 is a diagram illustrating components of a real-time 3D shape validation in a checkout system, according to an example embodiment.

FIG. 1 is a diagram illustrating components of a real-time 3D shape validation in a checkout system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time 3D shape validation during checkouts at a terminal 110, presented herein and below.

Furthermore, the techniques and the systems presented herein and below (for real-time 3D shape validation) may include all or some combination of the components shown with the system 100. The methods are programmed as executable instructions in memory and/or non-transitory computer-readable storage media and executed on one or more processors associated with the components/devices.

Specifically, the system 100 includes a terminal 110, a transaction manager 120, a scanner 130 having an item scan manager 131 and optionally, an embedded 3D camera 132. The system also includes an overhead 3D camera 133 (when the scanner 130 lacks any embedded 3D camera 132) and a self-learning item shape database 140.

3D cameras 132 and 133 provide distance information through one or more distance sensors. That is, resulting images taken by 3D cameras provide a depth analysis of an object's surfaces based on the distance of the surfaces from the sensors. This is typically provided in greyscale pixels with each pixel includes depth data and brightness value. The depth data is analogous to a grayscale image. In some cases, the 3D cameras 132 and 133 can provide Red-Green-Blue (RGB), grayscale, or any number of color formats for the pixels with the depth data (depth values) provided by the 3D cameras 132 and 133 with that RGB, grayscale, or color format data. The distances of points along the surfaces of the object to the sensor may be expressed or converted to millimeter units.

One difficulty encountered by item image validation is determining the correct orientation of the item captured in the image by a scanner because without some guidance, the number of possible orientations can be substantial large. This makes image comparisons to model item images both time and processor inefficient.

The system 100 provides a mechanism by which dimensions for a shape of an item being scanned can be time and processor efficiently determined based on expected orientations and the depth or distance values provided by the 3D camera 132 and 133. The shape with dimensions can then be compared to expected dimensions for the item identified in the scanned barcode by the item scan manager 131 to validate or invalidate the scan of the item during checkout in real time.

During initial configuration, the item scan manager 131 is configured to recognize the distance between the scan surface and the sensor of the 3D camera 132 or 133. The item scan manager 131 also includes image edge detection processing for obtaining edges of a surface captured by the 3D camera 132 or 133. Furthermore, the item scan manager 131 is configured for accessing and interfacing with the self-learning item shape database 140. Barcode identifiers for items are linked with orientations in the database 140. Each orientation revealing the exposed surface for an item along with its expected dimensions. That is, the barcode is typically placed on a given item in a small subset of locations (such as on a bottom surface, on a side surface along a bottom corner or in a center along the bottom on the side surface, etc.). The orientations for the item that is expected based on the barcode being exposed for scanning by a camera of the scanner 130 are the orientations that are expected to be in the field of view of the 3D scanner when the item's barcode is captured by the camera.

For example, a cereal box may have six surfaces each in a shape of a rectangle. The barcode is placed on the bottom surface and the back-side surface along the bottom edge. When the barcode is scanned there are two possible orientations facing the 3D camera 132 or 133 when the 3D camera 132 or 133 takes a 3D image of the cereal box (one oriented where the box image is captured looking down on the top surface of the box or one where the box image is captured with the box on its side looking down on the a side surface). The dimensions of the shape of the available orientations can be calculated from the depth values provided in the 3D image captured by the 3D camera 132 or 133 using the edge processing and the depth values. This can then be compared by the item scan manger 131 against expected dimensions for the time to determine in real time whether the shape of the item matches an expected shape of the item defined in the decoded item bar code information scanned from the barcode.

Conventional approaches capture an image and attempt to match the captured shape to a model for the expected item (based on the scanner item barcode). These approaches fail because it is time and processor intensive to match a shape in an image to a model for an item without first having orientation information for the shape. Orientation resolution and dimension calculation is also more difficult with conventional pixel-based values (pixels that lack 3D depth values).

The processing discussed herein alleviates these problems by utilizing 3D pixel values captured by an independent 3D camera 132 or 133 for an item along with database 140 that provides the expected orientations of surfaces of the item exposed to the 3D camera 132 and 133 when an item barcode is scanned (along with the dimensions of the shape provided in the orientation).

During operation, an item is placed in the field-of-view of a camera for the scanner 130 and the item information is captured, at the same time a 3D image of the item is captured. The item scan manager 131 performs item lookup based on the item information in the scanned barcode. The item identifier from the item information is located in the database 140 and the orientations expected to be present in the 3D image are returned along with expected dimensions for each orientation. The item scan manager 131 performs edge detection on the 3D image and calculates the dimensions for the shape exposed in the available orientations, which is then compared against the expected dimensions.

The item scan manager 131 them makes a real-time decision to add an item price for the scanned item barcode to a transaction being processed by the transaction manager 120 or whether to issue an alert to the transaction manager 120 indicating that the scanned item barcode does not match an expected shape for the item assigned to the item barcode. The transaction manager 120 may, in response to an invalidated shape alert, halt an in-progress transaction at the terminal 110 and send an alert to an attendant device indicating that the transaction needs audited by an attendant.

The available orientations and dimensions for the items are linked to item identifiers in the database 140. The 3D images provide depth values for surfaces of an item captured by the 3D camera 132 or 133. The item scan manager 131 processes real time captured images and 3D images and interacts with the database 140 to calculate a shape in an available orientation and dimensions of the shape. This is compared against what is expected and a real-time decision is made as to whether to validate the scanned item for continued transaction processing by the transaction manager 120 as to whether to invalidate the scanner item and suspending the transaction being processed by the transaction manager 120.

In an embodiment, the system 100 includes two or more two-dimensional (2D) cameras 134 situated overhead and/or around the scan surface where an item is scanned with each camera focused on the same area of the item being scanned. A stereovision technique is processed to derive the depth data. In this embodiment, 3D cameras are not needed.

In an embodiment, the terminal 110 is a POS terminal operated by an attendant.

In an embodiment, the terminal 110 is a SST. In an embodiment, the SST is a kiosk for self-retail checkout.

The above discussed embodiments and other embodiments are now discussed with reference to the FIGS. 2-4.

Figure 2:
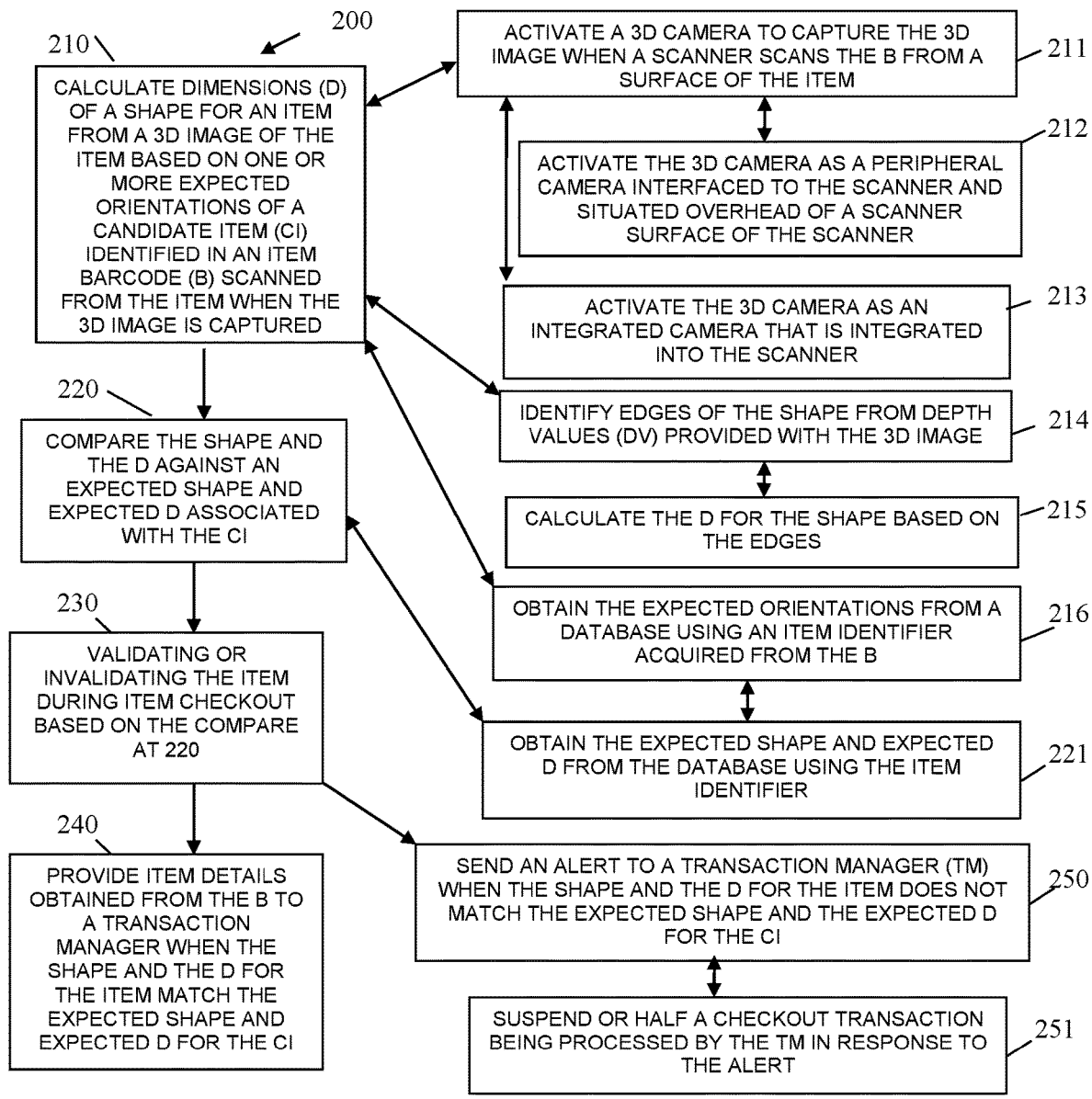
FIG. 2 is a diagram of a method for real-time 3D shape validation during a checkout, according to an example embodiment.

FIG. 2 is a diagram of a method 200 for real-time 3D item shape validation during a checkout at a terminal, according to an example embodiment. The software module(s) that implements the method 200 is referred to as a "3D item shape validator." The 3D item shape validator is implemented as executable instructions programmed and residing within memory and/or a non-transitory computer-readable (processor-readable) storage medium and executed by one or more processors of a device. The processor(s) of the device that executes the 3D item shape validator are specifically configured and programmed to process the 3D item shape validator. The 3D item shape validator may have access to a network during its processing. The network can be wired, wireless, or a combination of wired and wireless.

In an embodiment, the device that executes the 3D item shape validator is the scanner 130.

In an embodiment, the 3D item shape validator is the item scan manager 131.

In an embodiment, the device that executes the 3D item shape validator is a server that is interfaced to the item scan manager 131 and/or the transaction manager 120 during item checkout at a terminal.

In an embodiment, the 3D item shape validator is a combination of the transaction manager 120 and the item scan manager 131.

At 210, the 3D item shape validator calculates dimensions (height, length, width in millimeters) of a shape for an item from a 3D image of the item based on one or more expected orientations of a candidate item identified in an item barcode scanned from the item when the 3D image is captured.

In an embodiment, at 211, the 3D item shape validator activates a 3D camera to capture the 3D image when a scanner scans the item barcode from a surface of the item.

In an embodiment of 211 and at 212, the 3D item shape validator activates the 3D camera as peripheral camera interfaced to the scanner and situated overhead of a scanner surface of the scanner.

In an embodiment of 211 and at 213, the 3D item shape validator activates the 3D camera as an integrated camera that is integrated into the scanner.

It is noted that the scanner includes one or more imaging cameras or lasers that are independent and separate from the 3D camera. The imaging cameras or lasers for obtaining an image or reading the item barcode from the surface of the item.

In an embodiment, at 214, the 3D item shape validator identifies edges of the shape from depth values provided in the pixels with the 3D image.

In an embodiment of 214 and at 215, the 3D item shape validator calculates the dimensions for the shape based on the edges.

In an embodiment, at 216, the 3D item shape validator obtains the expected orientations from a database using the item identifier acquired from the item barcode.

At 220, the 3D item shape validator compares the shape and the dimensions against an expected shape and expected dimensions associated with the candidate item.

In an embodiment of 216 and 220, at 221, the 3D item shape validator obtains the expected shape and the expected dimensions using the item identifier.

At 230, the 3D item shape validator validates or invalidates the item during item checkout based on the comparison at 220.

According to an embodiment, at 240, the 3D item shape validator provides item details obtained from the item barcode to a transaction manager when the shape and the dimensions match the expected shape and the expected dimensions for the candidate item.

In an embodiment, at 250, the 3D item shape validator sends an alert to a transaction manager when the shape and the dimensions for the item does not match the expected shape and the expected dimensions for the candidate item.

In an embodiment of 250 and at 251, the 3D item shape validator suspends or halts (or caused to be suspended or halted) a checkout transaction being processed by the transaction manager in response to the alert sent at 250.

Figure 3:
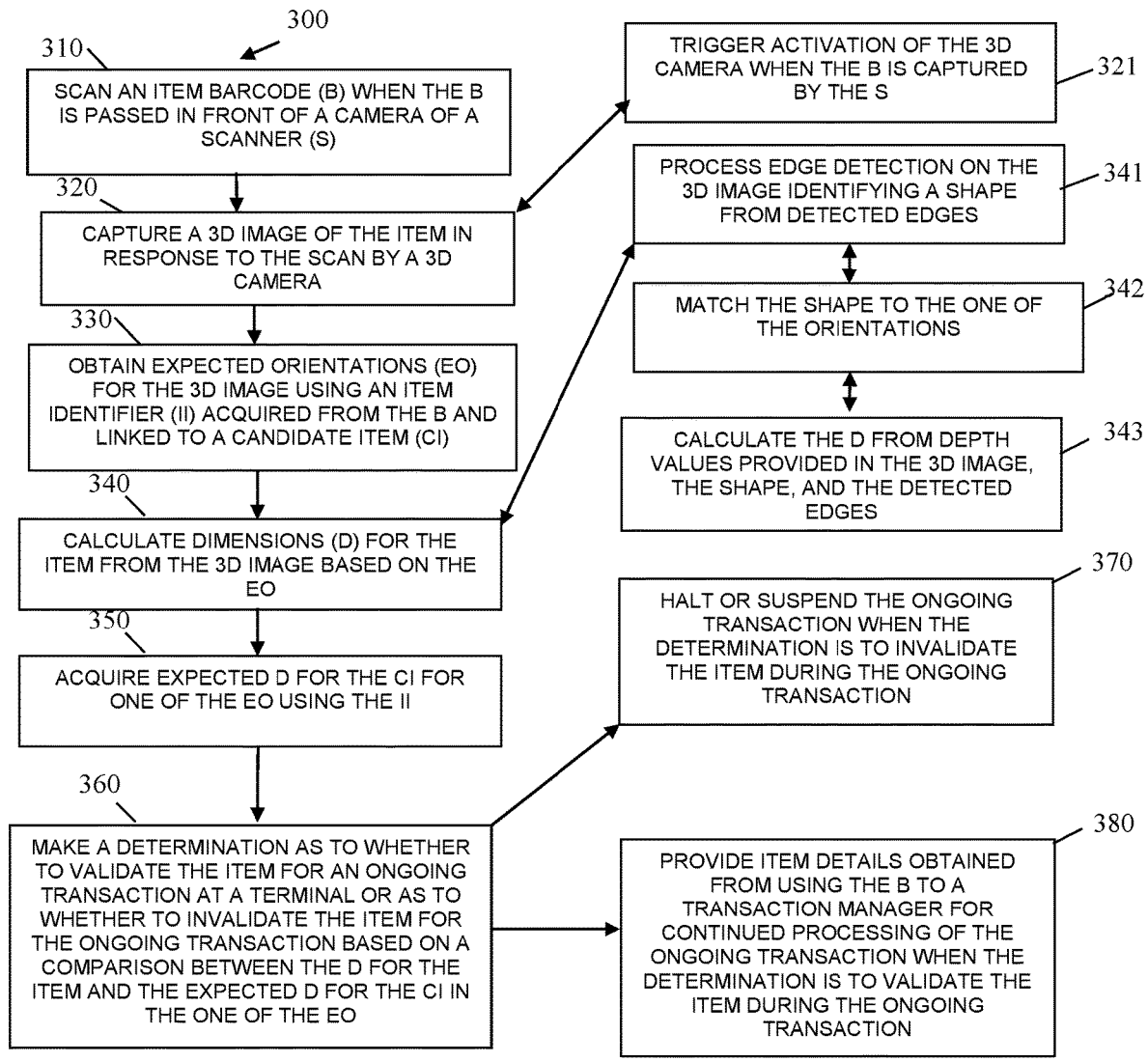
FIG. 3 is a diagram of another method for real-time 3D shape validation during a checkout, according to an example embodiment.

FIG. 3 is a diagram of another method 300 for real-time 3D item shape validation during an item checkout, according to an example embodiment. The software module(s) that implements the method 300 is referred to as a "3D item shape verifier." The r3D item shape verifier is implemented as executable instructions programmed and residing within memory and/or a non-transitory computer-readable (processor-readable) storage medium and executed by one or more processors of a hardware device. The hardware processors that execute the 3D item shape verifier are specifically configured and programmed to process 3D item shape verifier. The r3D item shape verifier may have access to one or more networks during its processing. Each network can be wired, wireless, or a combination of wired and wireless.

The 3D item shape verifier presents another and in some ways enhanced processing perspective of the FIG. 2.

In an embodiment, the device that executes the 3D item shape verifier is the scanner 130.

In an embodiment, the devices that execute the 3D item shape verifier is a combination of the terminal 110 and the scanner 130.

In an embodiment, the device that executes the 3D item shape verifier is a server interfaced to the item scan manager 131 and/or the transaction manager 120 during item checkout at the terminal 110.

In an embodiment, the 3D item shape verifier is the item scan manager 131.

In an embodiment, the 3D item shape verifier is a combination of the transaction manager 120 and the item scan manager 131.

In an embodiment, the 3D item shape verifier is the method 200 of the FIG. 2.

At 310, the 3D item shape verifier scan an item barcode when the item barcode is passed in front of a field-of-view of a camera of a scanner.

At 320, the 3D item shape verifier captures a 3D image of the item in response to the scan by a 3D camera. The 3D camera is independent and separate from the camera of the scanner performing item barcode processing.

In an embodiment, at 321, the 3D item shape verifier triggers activation of the 3D camera when the item barcode is captured by the scanner.

At 330, the 3D item shape verifier obtains expected orientations for the 3D image using an item identifier acquire from the item barcode and linked to a candidate item.

At 340, the 3D item shape verifier calculates dimensions for the item from the 3D image based on the expected orientations.

In an embodiment, at 341, the 3D item shape verifier processes edge detection on the 3D image for identifying a shape from the detected edges.

In an embodiment of 341 and at 342, the 3D item shape verifier matches the shape to a particular one of the orientations.

In an embodiment of 342 and at 343, the 3D item shape verifier calculates the dimensions from depth values provided in the 3D image, the shape, and the detected edges.

At 350, the 3D item shape verifier acquires expected dimensions for the candidate item for the particular expected orientation using the item identifier.

At 360, the 3D item shape verifier makes a determination as to whether to validate the item for an ongoing transaction at a terminal or as to whether to invalidate the time for the ongoing transaction based on comparison between the dimensions for the item and the expected dimensions for the candidate item in the particular orientation.

In an embodiment, at 370, the 3D item shape verifier halts or suspends the ongoing transaction when the determination is to invalidate the item during the ongoing transaction.

In an embodiment, at 380, the 3D item shape verifier provides item details obtained from using the item barcode to a transaction manager for continued processing of the ongoing transaction when the determination is to validate the item during the ongoing transaction.

Figure 4:
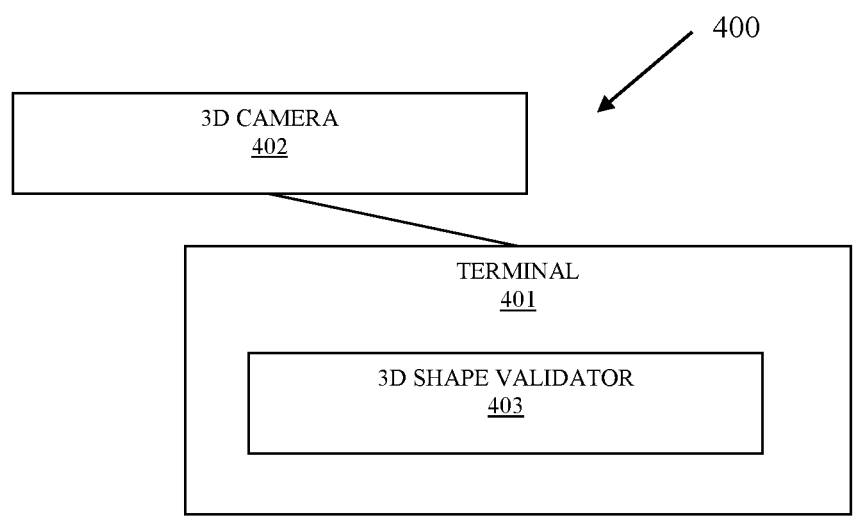
FIG. 4 is a diagram of terminal for real-time 3D shape validation during a checkout, according to an example embodiment.

FIG. 4 is a diagram of system 400 for 3D item shape validation in real time during item checkout, according to an example embodiment. Some components of the system 400 are programmed and reside within memory and/or a non-transitory computer-readable medium and execute on one or more processors of the system 400 and/or integrated peripheral devices of a terminal 401. The system 400 communicates over one or more networks, which can be wired, wireless, or a combination of wired and wireless.

In an embodiment, the system 400 is the system 100.

In an embodiment, the terminal 401 is a POS terminal.

In an embodiment, the terminal 401 is a SST.

In an embodiment, the system 400 implements, among other things, the processing discussed in the FIGS. 1-3.

The system 400 includes a terminal 401, a 3D camera 402, and a 3D shape validator 403.

The 3D camera 402 is configured to capture 3D images of items when item barcodes for the items are scanned at the terminal 401 during item transactions.

The 3D shape validator 403 is configured to: 1) execute on at least one processor of the terminal 401 or a scanner, 2) match orientations for the items in the 3D items to expected orientations of the items when the item barcodes are scanned, 3 determine shapes of the items from the expected orientations, 4 calculate dimensions for the shapes from depth values provided in the 3D images and the shapes, and 5) determine whether to validate or invalidate the items based on a comparison of the dimensions to expected dimensions for candidate items identified by using the item barcodes in real time during the item transactions.

In an embodiment, the 3D shape validator 403 is the item scan manager 131.

In an embodiment, the 3D shape validator 403 is the method 200.

In an embodiment, the 3D shape validator 403 is the method 300.

In an embodiment, the 3D shape validator 403 executes on a processor of a scanner integrated into the terminal 401. In an embodiment, the scanner is the scanner 130.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    calculating dimensions of a shape for an item from a three-dimensional (3D) image of the item based on one or more expected orientations of a candidate item identified in an item barcode scanned from the item when the 3D image is captured, wherein each of the one or more expected orientations are based on known locations on the item where the item barcode is present and a known field-of-view of a 3D camera that captures the 3D image;
    comparing the shape and the dimensions against an expected shape and expected dimensions associated with the candidate item; and
    validating or invalidating the item during item checkout based on the comparing.

2. The method of claim 1, wherein calculating further includes activating the 3D camera to capture the 3D image when a scanner scans the item barcode from a surface of the item.

3. The method of claim 2, wherein activating further includes activating the 3D camera as a peripheral camera interfaced to the scanner and situated overhead of a scanner surface of the scanner.

4. The method of claim 2, wherein activating further includes activating the 3D camera as an integrated camera that is integrated into the scanner.

5. The method of claim 1, wherein calculating further includes identifying edges of the shape from depth values provided with the 3D image.

6. The method of claim 5, wherein identifying further includes calculating the dimensions for the shape based on the edges.

7. The method of claim 1, wherein calculating further includes obtaining the expected orientations from a database using an item identifier acquired from the item barcode.

8. The method of claim 7, wherein comparing further includes obtaining the expected shape and expected dimensions from the database using the item identifier.

9. The method of claim 1 further comprising providing item details obtained from the item barcode to a transaction manager when the shape and dimensions for the item match the expected shape and the expected dimensions for the candidate item.

10. The method of claim 1 further comprising, sending an alert to a transaction manager when the shape and the dimensions for the item does not match the expected shape and the expected dimensions for the candidate item.

11. The method of claim 10, wherein sending further includes suspending or halting a checkout transaction being processed by the transaction manager in response to the alert.

12. A method, comprising:
    scanning an item barcode when the item barcode is passed in front of a camera of a scanner;
    capturing a three-dimensional (3D) image of the item in response to the scanning by a 3D camera;
    obtaining expected orientations for the 3D image using an item identifier acquired from the item barcode and linked to a candidate item, wherein each of the expected orientations are based on known locations on the item where the item barcode is present and a known field-of-view of the 3D camera that captures the 3D image;
    calculating dimensions for the item from the 3D image based on the expected orientations;
    acquiring expected dimensions for the candidate item for one of the expected orientations using the item identifier; and
    making a determination as to whether to validate the item for an ongoing transaction at a terminal or as to whether to invalidate the item for the ongoing transaction based on a comparison between the dimensions for the item and the expected dimensions for the candidate item in the one of the expected orientations.

13. The method of claim 12, wherein capturing further includes triggering activation of the 3D camera when the item barcode is captured by the scanner.

14. The method of claim 12, wherein calculating further includes processing edge detection on the 3D image identifying a shape from detected edges.

15. The method of claim 14, wherein processing further includes matching the shape to the one of the orientations.

16. The method of claim 15, wherein matching further includes calculating the dimensions from depth values provided in the 3D image, the shape, and the detected edges.

17. The method of claim 12 further comprising halting or suspending the ongoing transaction when the determination is to invalidate the item during the ongoing transaction.

18. The method of claim 12 further comprising, providing item details obtained using the item barcode to a transaction manager for continued processing of the ongoing transaction when the determination is to validate the item during the ongoing transaction.

19. A system, comprising:
- a terminal configured to processing item transactions;
- a three-dimensional (3D) camera configured to capture 3D images of items when item barcodes are scanned from the items during the item transactions; and
- a 3D shape validator configured to:

i) match orientations for the items in the 3D items to expected orientations of the items when the item barcodes are scanned based on known locations on the items where the item barcodes are present and a known field-of-view of a 3D camera that captures the 3D image, ii) determine shapes of the items from the expected orientations, iii) calculate dimensions for the shapes from depth values provided in the 3D images and the shapes, and iv) determine whether to validate or invalidate the items based on a comparison of the dimensions to expected dimensions for candidate items identified by using the item barcodes in real time during the item transactions.

20. The system of claim 19, wherein the terminal is one of: Self-Service Terminal (SST) and a cashier-assisted Point-Of-Sale (POS) terminal.

* * * * *